US011343146B1

(12) United States Patent
Mohanty et al.

(10) Patent No.: US 11,343,146 B1
(45) Date of Patent: May 24, 2022

(54) AUTOMATICALLY DETERMINING CONFIGURATION-BASED ISSUE RESOLUTIONS ACROSS MULTIPLE DEVICES USING MACHINE LEARNING MODELS

(71) Applicant: Dell Products L.P., Round Rock, TX (US)

(72) Inventors: Bijan K. Mohanty, Austin, TX (US); Gregory M. Ramsey, Seattle, WA (US)

(73) Assignee: Dell Products L.P., Round Rock, TX (US)

( * ) Notice: Subject to any disclaimer, the term of this patent is extended or adjusted under 35 U.S.C. 154(b) by 16 days.

(21) Appl. No.: 17/148,738

(22) Filed: Jan. 14, 2021

(51) Int. Cl.
*G06F 15/173* (2006.01)
*H04L 41/0816* (2022.01)
*H04L 41/0893* (2022.01)
*G06K 9/62* (2022.01)

(52) U.S. Cl.
CPC ........ *H04L 41/0816* (2013.01); *G06K 9/6215* (2013.01); *G06K 9/6251* (2013.01); *G06K 9/6276* (2013.01); *H04L 41/0893* (2013.01)

(58) Field of Classification Search
None
See application file for complete search history.

(56) References Cited

U.S. PATENT DOCUMENTS

| 9,529,635 | B2 | 12/2016 | Werth et al. | |
|---|---|---|---|---|
| 10,602,417 | B2 | 3/2020 | Vemuri et al. | |
| 2004/0088389 | A1 | 5/2004 | Shah | |
| 2008/0219276 | A1 | 9/2008 | Shah | |
| 2013/0097686 | A1* | 4/2013 | Towata | G06F 21/608 726/9 |
| 2020/0196122 | A1* | 6/2020 | Junk | H04L 9/3242 |

* cited by examiner

*Primary Examiner* — Thanh T Nguyen
(74) *Attorney, Agent, or Firm* — Ryan, Mason & Lewis, LLP

(57) ABSTRACT

Methods, apparatus, and processor-readable storage media for automatically determining configuration-based issue resolutions across multiple devices using machine learning models are provided herein. An example computer-implemented method includes training, using historical data related to device information and device configuration information from a set of devices, multiple machine learning models; determining, in connection with input data associated with a given device from the set of devices, a device issue and a corresponding device issue resolution, by processing the input data using at least a first of the machine learning models; identifying additional devices within the set of devices that are similar to the given device by processing the input data using at least a second of the machine learning models; and performing, based on the determined device issue resolution, automated actions in connection with the given device and at least a portion of the identified additional devices.

20 Claims, 9 Drawing Sheets

FIG. 4

```
tf_vectorizer = TfidfVectorizer(analyzer='word', ngram_range=(1, 3), min_df=0,
        stop_words='english')
df_attributes['all_content']=    df_attributes['operating_system']    +
        attributes_list['version_number'] + attributes_list['security_patch'] +
        attributes_list['resolution']
tfidf_all_content = tf_vectorizer.fit_transform(attributes_list['all_content'])
```

FIG. 5

```
import pandas as pd
import sklearn
from nltk.corpus import stopwords
from sklearn.feature_extraction.text import TfidfVectorizer
from sklearn.metrics.pairwise import cosine_similarity
from sklearn.metrics.pairwise import linear_kernel
from scipy.stats import pearsonr import Configuration issue/resolution data
df_attributes = pd.read_csv('data/incident_resolution.csv', index_col=0)

df_attributes.head()

df_attributes ['all_content'] = df_attributes ['operating_system'] + df_attributes ['version_number'] + df_attributes ['security']

# Use tf-idf vectorizer to encode/vectorize the content
tf_vectorizer = TfidfVectorizer (analyzer='word', ngram_range=(1, 3), min_df=0, stop_words='english')
tfidf_all_content = tf_vectorizer.fit_transform(df_attributes['all_content'])

tfidf_all_content_array = tfidf_all_content.toarray ()

def recommend_pearson(incident_content):
    correlation = []
    for i in range(len(tfidf_all_content_array)):
        correlation.append(pearsonr(incident_content, tfidf_all_content_array[i]) [0])
    correlation = list(enumerate(correlation))
    sorted_corr = sorted(correlation, reverse=True, key=lambda x: x[1]) [1:6]
    resolution_index = [i[0] for i in sorted_corr]
    return df_attributes.iloc[resolution_index]
```

```
# Calculate the Euclidean distance between two vectors
def euclidean_distance(deviceData1, deviceData2):
    distance = 0.0
    for i in range(len(deviceData1)-1):
        distance += (deviceData1[i] - deviceData2[i])**2
    return sqrt(distance)
```

FIG. 7

```
# Locate the most similar neighbors
def get_neighbors(hist_devices, device_to_match, num_neighbors):
    distances = list()
    for each_device in hist_devices:
        dist = euclidean_distance(device_to_match, each_device)
        distances.append((each_device, dist))
    distances.sort(key=lambda tup: tup[1])
    neighbors = list()
    for i in range(num_neighbors):
        neighbors.append(distances[i][0])
    return neighbors
```

FIG. 8

```
                for i in range(len(row)):
                    row[i] = (row[i] - minmax[i] [0] / (minmax[i] [1] - minmax[i] [0])

# Calculate the Euclidean distance between two vectors
def euclidean_distance(deviceData1, deviceData2):
    distance = 0.0
    for i in range(len(deviceData1)-1):
        distance += (deviceData1[i] - deviceData2[i])**2
    return sqrt(distance)

# Locate the most similar neighbors
def get_neighbors(hist_devices, device_to_match, num_neighbors):
    distances = list()
    for each_device in hist_devices:
        dist = euclidean_distance(device_to_match, each_device)
        distances.append((each_device, dist))
    distances.sort(key=lambda tup: tup[1])
    neighbors = list()
    for i in range(num_neighbors):
        neighbors.append(distances[i] [0])
    return neighbors

# Get a list of matching devices with KNN on Device attributes Dataset
filename = 'all_device_attributes.csv'
dataset = load_csv(filename)
for i in range(len(dataset[0])-1:
    str_column_to_float(dataset, i)
# convert class column to integers
str_column_to_int(dataset, len(dataset[0])-1)
# define model parameter K value as 5
```

800

AUTOMATICALLY DETERMINING CONFIGURATION-BASED ISSUE RESOLUTIONS ACROSS MULTIPLE DEVICES USING MACHINE LEARNING MODELS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The field relates generally to information processing systems, and more particularly to techniques for software management in such systems.

BACKGROUND

Sets or networks of user devices commonly host a multitude of software that can include operating systems (OS), device drivers, system software, application software, etc., and portions of such software often work in tandem to provide satisfactory performance. Issues among such software including configuration mismatches, lack of patch management and/or updates, software version discrepancies, etc., can cause detrimental effects on device behavior(s), introduce security and vulnerability risks, and/or produce potential outages.

However, conventional device management techniques typically include manual reactive actions taken in response to user communications, often requiring time-consuming and error-prone troubleshooting efforts that can be duplicative across multiple devices.

SUMMARY

Illustrative embodiments of the disclosure provide techniques for automatically determining configuration-based issue resolutions across multiple devices using machine learning models. An exemplary computer-implemented method includes training, using historical data related to device information and device configuration information from a set of devices, multiple machine learning models comprising: at least a first machine learning model configured to determine one or more device issues and one or more corresponding device issue resolutions, and at least a second machine learning model configured to identify similar devices within the set of devices. The method also includes determining, in connection with input data associated with a given device from the set of devices, at least one device issue and at least one corresponding device issue resolution, by processing at least a portion of the input data using the at least a first machine learning model. Further, the method additionally includes identifying one or more additional devices within the set of devices that are similar to the given device by processing at least a portion of the input data using the at least a second machine learning model, and performing, based at least in part on the at least one determined device issue resolution, one or more automated actions in connection with the given device and at least a portion of the one or more identified additional devices.

Illustrative embodiments can provide significant advantages relative to conventional device management techniques. For example, problems associated with duplicative and error-prone manual troubleshooting efforts are overcome in one or more embodiments through automatically determining configuration-based issue resolutions across multiple devices using machine learning models.

These and other illustrative embodiments described herein include, without limitation, methods, apparatus, systems, and computer program products comprising processor-readable storage media.

BRIEF DESCRIPTION OF THE DRAWINGS

FIG. 4 shows an example code snippet for computing a term frequency-inverse document frequency (TF-IDF) score in an illustrative embodiment.

FIG. 5 shows an example code snippet for using a TF-IDF score matrix and Pearson's correlation in an illustrative embodiment.

FIG. 6 shows an example code snippet for computation of a Euclidian distance between two data vectors in an illustrative embodiment.

FIG. 7 shows an example code snippet for determining a set of similar devices using nearest neighbor matching techniques in an illustrative embodiment.

FIG. 8 shows an example code snippet for implementing at least a portion of a similar device identification engine in an illustrative embodiment.

DETAILED DESCRIPTION

Illustrative embodiments will be described herein with reference to exemplary computer networks and associated computers, servers, network devices or other types of processing devices. It is to be appreciated, however, that these and other embodiments are not restricted to use with the particular illustrative network and device configurations shown. Accordingly, the term "computer network" as used herein is intended to be broadly construed, so as to encompass, for example, any system comprising multiple networked processing devices.

Figure 1:
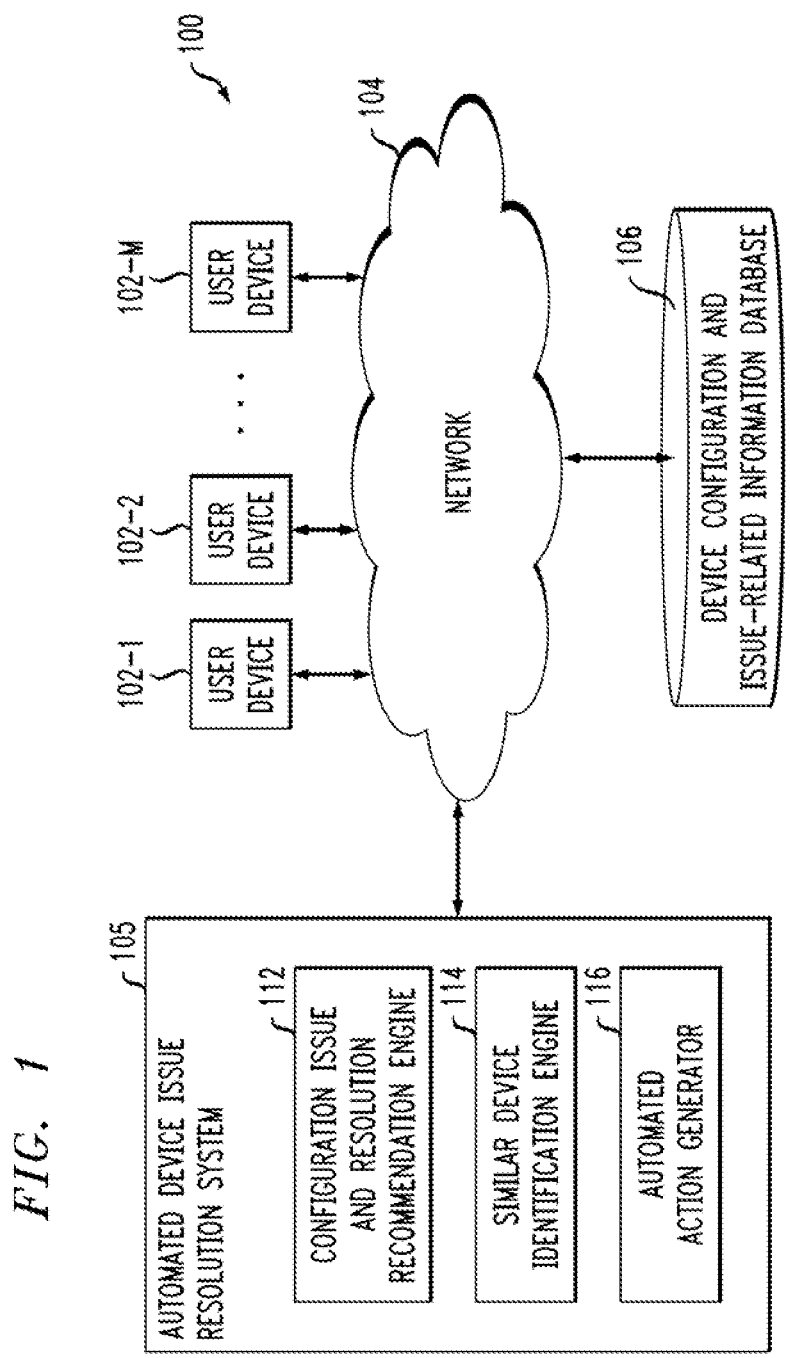
FIG. 1 shows an information processing system configured for automatically determining configuration-based issue resolutions across multiple devices using machine learning models in an illustrative embodiment.

FIG. 1 shows a computer network (also referred to herein as an information processing system) 100 configured in accordance with an illustrative embodiment. The computer network 100 comprises a plurality of user devices 102-1, 102-2, . . . 102-M, collectively referred to herein as user devices 102. The user devices 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to network 104 is automated device issue resolution system 105.

The user devices 102 may comprise, for example, mobile telephones, laptop computers, tablet computers, desktop computers or other types of computing devices. Such devices are examples of what are more generally referred to herein as "processing devices." Some of these processing devices are also generally referred to herein as "computers."

The user devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Additionally, automated device issue resolution system 105 can have an associated database 106 configured to store data pertaining to configuration information for multiple devices (e.g., devices in a given ecosystem or environment), as well as issue-related information which can include, for example, data related to cases, issues, problems and incidents for one or more devices.

The database 106 in the present embodiment is implemented using one or more storage systems associated with automated device issue resolution system 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with automated device issue resolution system 105 can be one or more input-output devices, which illustratively comprise keyboards, displays or other types of input-output devices in any combination. Such input-output devices can be used, for example, to support one or more user interfaces to automated device issue resolution system 105, as well as to support communication between automated device issue resolution system 105 and other related systems and devices not explicitly shown.

Additionally, automated device issue resolution system 105 in the FIG. 1 embodiment is assumed to be implemented using at least one processing device. Each such processing device generally comprises at least one processor and an associated memory, and implements one or more functional modules for controlling certain features of automated device issue resolution system 105.

More particularly, automated device issue resolution system 105 in this embodiment can comprise a processor coupled to a memory and a network interface.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

The network interface allows automated device issue resolution system 105 to communicate over the network 104 with the user devices 102, and illustratively comprises one or more conventional transceivers.

The automated device issue resolution system 105 further comprises configuration issue and resolution recommendation engine 112, similar device identification engine 114, and automated action generator 116.

It is to be appreciated that this particular arrangement of modules 112, 114, and 116 illustrated in the automated device issue resolution system 105 of the FIG. 1 embodiment is presented by way of example only, and alternative arrangements can be used in other embodiments. For example, the functionality associated with modules 112, 114, and 116 in other embodiments can be combined into a single module, or separated across a larger number of modules. As another example, multiple distinct processors can be used to implement different ones of modules 112, 114, and 116 or portions thereof.

At least portions of modules 112, 114, and 116 may be implemented at least in part in the form of software that is stored in memory and executed by a processor.

It is to be understood that the particular set of elements shown in FIG. 1 for automatically determining configuration-based issue resolutions across multiple devices using machine learning models involving user devices 102 of computer network 100 is presented by way of illustrative example only, and in other embodiments additional or alternative elements may be used. Thus, another embodiment includes additional or alternative systems, devices and other network entities, as well as different arrangements of modules and other components. For example, in at least one embodiment, automated device issue resolution system 105 and device configuration and issue-related information database 106 can be on and/or part of the same processing platform (such as, for example, depicted in FIG. 3).

An exemplary process utilizing modules 112, 114, and 116 of an example automated device issue resolution system 105 in computer network 100 will be described in more detail with reference to the flow diagram of FIG. 9.

Accordingly, at least one embodiment includes techniques for automated device management and self-healing. As detailed herein, such device management can include OS management, software and security patch management, application management, levels 1 and 2 service desk operations, as well as device management of servers, storage devices, and networking devices.

As detailed herein, one or more embodiments includes identifying device conditions (e.g., OS, software versions, patch status, security parameters, etc.) and predicting one or more potential issues related thereto, and automatically publishing the appropriate software solution(s) and/or patch (es) to one or more specific devices to address the one or more predicted issues. Such an embodiment includes preventing or limiting unfortunate issue-related consequences such as outages, security events, performance degradation, etc., and such benefits are achieved in part by developing and/or building insights in correlating between incidents and/or problem entities of a given device with the configuration item condition parameters of that device, and using one or more machine learning techniques to predict one or more issues and infer such issues across other devices. Accordingly, at least one embodiment includes automatically predicting an issue before it occurs and recommending a solution and/or resolution action to be carried out to prevent the issue across one or more devices.

In other words, one or more embodiments include implementing a proactive approach to device configuration management by predicting one or more configuration issues in one or more devices, recommending configurations for resolving the one or more issues, and automatically applying the recommended configurations across other similar and/or related devices in a given ecosystem or environment, thus introducing auto-healing of devices. Specifically, such an embodiment includes combining configuration information (CI) of multiple devices from at least one device monitoring and management system and case and/or incident information from at least one information technology service management (ITSM) system to build insights. As further detailed herein, such an embodiments also includes leveraging machine learning techniques to predict which devices from a given and/or relevant ecosystem of devices may be at risk of an issue processed in connection with another device within the ecosystem, and to recommend the appropriate actions (software update(s), patch(es), security versioning, etc.) to those devices.

As depicted in FIG. 1 and further described herein, at least one embodiment includes implementing at least one configuration issue and resolution recommendation engine and at least one similar device identification engine, both of which are configured with one or more machine learning techniques. Such an embodiment includes obtaining asset and configuration information from multiple managed devices from at least one given ecosystem or environment, as well as issue-related information associated with such devices including information pertaining to case identification as well as software-related issues, problems and/or incidents. As further detailed herein, at least a portion of such obtained data can be used for machine learning model training and prediction generation.

As illustrated in FIG. 1 and detailed herein, a configuration issue and resolution recommendation engine is implemented in one or more embodiments and utilizes one or more machine learning techniques to process case and/or incident resolution data to predict at least one configuration-related issue and recommend an appropriate configuration modification for resolving the predicted issue(s). For example, an issue caused by an incorrect software version or security patch can be resolved by identifying and installing the correct software version or patch. This configuration issue and resolution recommendation engine, using machine learning techniques, processes input data pertaining to at least one given device and recommends at least one appropriate configuration and/or configuration modification based at least in part on historical data and developed insights, using content-based matching and recommendation algorithms.

Such algorithms can include content-based algorithms and collaborative-based algorithms. Content-based recommendation algorithms are based on matching features of one item with one or more other items and recommending the item(s) that matches the greatest number of the features of the item being searched and/or analyzed. Collaborative-based recommendation algorithms use a different approach wherein it is not the matched item(s) that is returned, but the other items (e.g., similar items) that were used along with the matched item(s). At least one embodiment includes using a content-based recommendation algorithm wherein the features of the case/incident are matched with historical cases/incidents, and the cases/incidents with the closest feature match(es) are returned as a recommendation. Also, it is to be appreciated that while one or more embodiments detailed herein include using Pearson correlation to match linearly, other embodiments can include the use of other algorithms such as, for example, support vector machines (SVMs), naïve Bayes, one or more neural networks, etc.

Additionally, in one or more embodiments, a similar device identification engine (as illustrated in FIG. 1 and further detailed herein) leverages a distance classification approach using K-nearest neighbor (KNN) and Euclidian distance algorithms to identify one or more similar devices (i.e., devices similar to the device analyzed by the configuration issue and resolution recommendation engine, as noted above) based at least in part on configuration information. For example, when a configuration-related issue is resolved for a specific device with a recommended configuration from the configuration issue and resolution recommendation engine, a workflow will be triggered with respect to the similar device identification engine, and utilizing at least one distance classification machine learning model, the engine will identify one or more similar devices in a given managed services ecosystem. Once the list of similar devices is returned by the machine learning-based similar device identification engine, the workflow will trigger an auto-publish of the new configuration to at least a portion of these identified devices.

Figure 2:
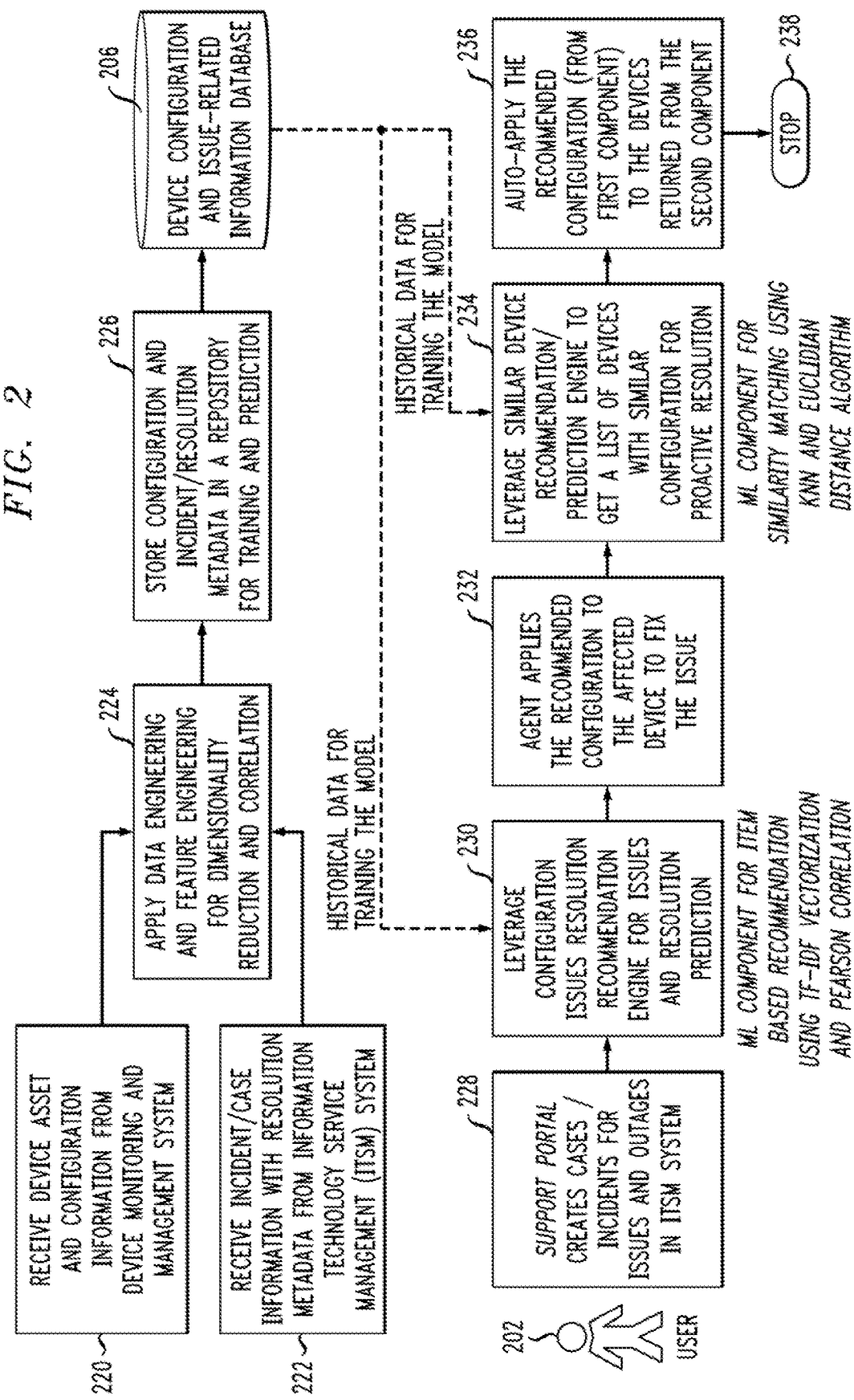
FIG. 2 shows an example process flow in an illustrative embodiment.

FIG. 2 shows an example process flow in an illustrative embodiment. Step 220 includes receiving device asset and configuration information from at least one device monitoring and management system, while step 222 includes receiving incident and/or case information with resolution data from at least one ITSM system, and step 224 includes applying data engineering and feature engineering techniques to the data received in steps 220 and 222 for dimensionality reduction and correlation. Step 226 includes storing the preprocessed data in database 206, which subsequently can be used to train one or more machine learning models in conjunction with steps 230 and 234, as further detailed below.

Step 228 includes creating, via a support portal engaged by a user and/or user device 202, one or more cases and/or incidents for one or more issues and/or outages in an ITSM system. Using such created information, step 230 includes leveraging a configuration issues resolution engine (which includes a machine learning model and/or component for item-based recommendation using TF-IDF vectorization and Pearson correlation, as further detailed herein) for predicting one or more issues and one or more corresponding resolutions. Step 232 includes applying, via one or more software agents, the recommended configuration(s) (e.g., software version and/or patch update) to the affected device to resolve the issue, and step 234 includes leveraging a similar device recommendation and/or prediction engine (which includes a machine learning model and/or component for similarity matching using KNN and Euclidian distance algorithms, as further detailed herein) to determine a list of devices with similar configuration(s) for proactive resolution of the one or more predicted issues. Further, step 236 includes automatically applying the recommended configuration(s) (as determined via the configuration issues resolution engine) to all of the devices identified via the similar device recommendation and/or prediction engine (e.g., for proactive resolution of the predicted issue(s)), and the process flow ends at step 238.

It should be appreciated that although the process flow depicted in FIG. 2 indicates that the prediction, recommendation and resolution are triggered by a user action of creating a case and/or incident to address at least one issue, one or more embodiments are not limited to this process initiation. Accordingly, at least one embodiment can, for example, include utilizing the same components as depicted in FIG. 2 as a proactive resolution mechanism to address configuration-related issues already addressed and documented in historical data. A batch process can be carried out, for instance, that retrieves all configuration issue related incidents from a metadata repository, and using a similar device identification engine, such an embodiment can include identifying all similar devices with similar configurations and applying the new configuration(s) thereto automatically. Additionally or alternatively, one or more embodiments can include building at least one workflow to identify each device in a metadata repository that has configurations older than a certain threshold, and utilizing a configuration issue and resolution recommendation engine to predict future issues and recommended corresponding actions, which can then be applied automatically to at least a portion of the devices.

Figure 3:
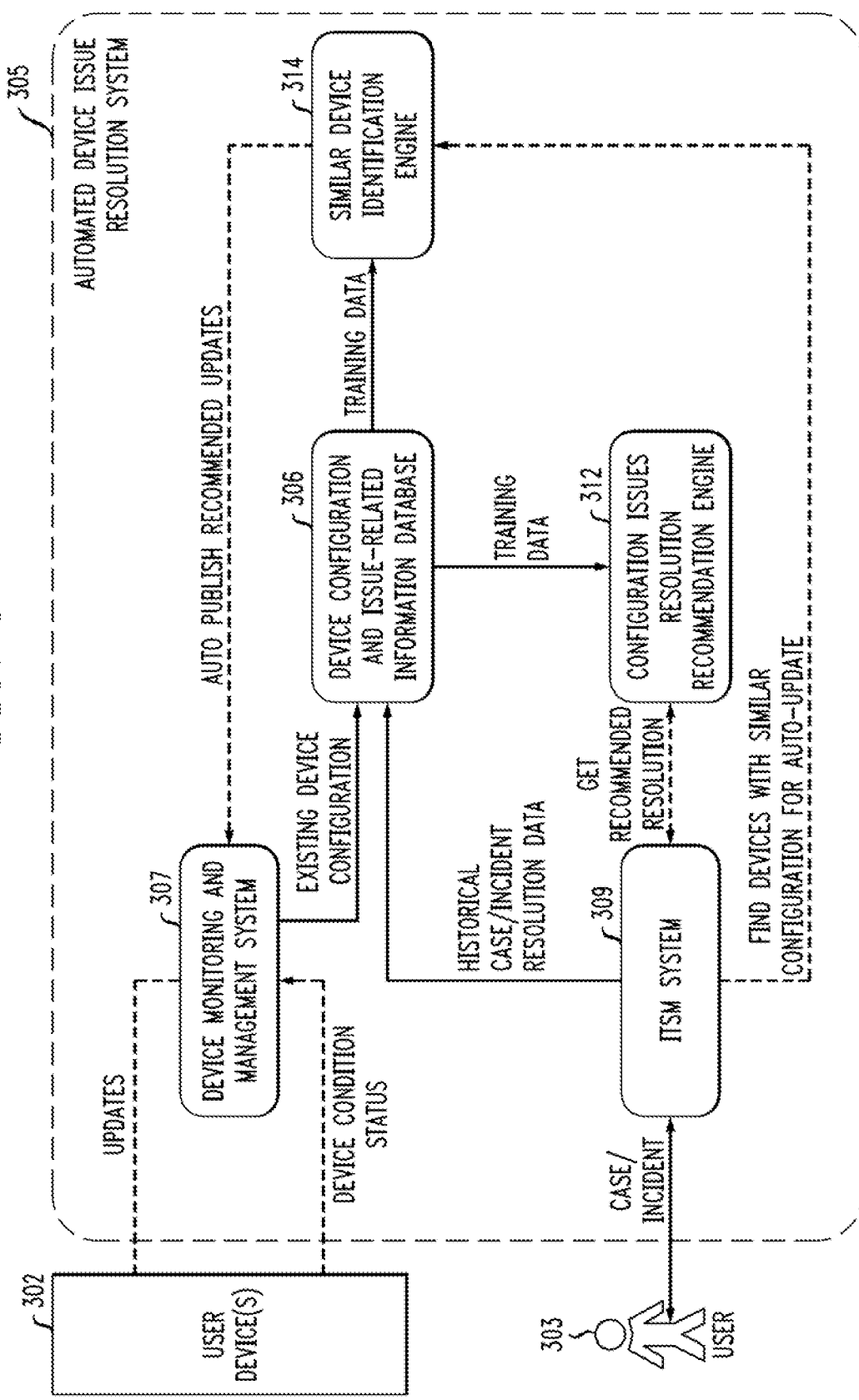
FIG. 3 shows an information processing system configured for automatically determining configuration-based issue resolutions across multiple devices using machine learning models in an illustrative embodiment.

FIG. 3 shows an information processing system configured for automatically determining configuration-based issue resolutions across multiple devices using machine learning models in an illustrative embodiment. By way of illustration, FIG. 3 depicts user device(s) 302 provide updates and device condition status information to device monitoring and management system 307 (within automated device issue resolution system 305), which provides existing device configuration information to device configuration and issue-related information database 306. Database 306 provides training data to configuration issues resolution recommendation engine 312 and similar device identification engine 314.

As also depicted in FIG. 3, user 303 inputs information pertaining to at least one case and/or incident to an ITSM system 309, which provides at least a portion of such data to database 306 (and, in one or more embodiments, interacts with similar device identification engine 314 to identify devices with similar configuration(s) for one or more auto- updates). As also depicted in FIG. 3, using at least portions of the data stored in database 306, configuration issues resolution recommendation engine 312 determines a recommended resolution to the issue(s) detailed in connection with the input provided by user 303, and provides the recommended resolution to ITSM system 309 (which then interacts with user 303). Additionally, similar device identification engine 314 identifies devices similar to the device associated with user 303 and automatically publishes recommended configuration updates to the device monitoring and management system 307.

In one or more embodiments, multiple data collection and recommendation workflows can be carried out. One such example workflow can include utilizing a device management tool, which collects configuration information from one or more devices on a scheduled basis (e.g., via automated scans of the devices), while another example workflow can include an ad hoc process initiated by a user input related to an issue and/or failure.

As also detailed herein, one or more embodiments include implementing a configuration issue and resolution recommendation engine, which is a smart engine responsible for classification and prediction of at least one issue related to at least one configuration mismatch in a given device. Such an engine also recommends the appropriate new configuration(s) that must be applied to the given device to resolve the issue(s). In at least one embodiment, this engine utilizes a content-based filtering and recommendation algorithm to match and predict the configuration issue(s) and recommended a configuration for resolution of the issue(s). Content-based recommendation uses attributes of the content (e.g., historical case and/or incident data with configuration-related issues) to recommend similar content.

Such an engine can include a model and can initiate one or more workflows using historical data from a case-resolution metadata repository for training the model. Such data can include information pertaining to configuration-related issues with cases and/or incidents, device and CI details, and the new configuration applied as part of the resolution. By way of example, attributes of sample data can include incident identification numbers, device identifiers, model numbers, operating systems identifiers, security patch information, issue descriptions, resolution descriptions, etc.

In at least one embodiment, such attributes are categorical values, while algorithms commonly work with numerical data. Accordingly, in such an embodiment, at least a portion of the attributes can be encoded or vectorized before being fed to a model for training and/or analysis.

Such encoding or vectorization techniques can include, for example, one-hot encoding, word embedding, and/or TF-IDF vectorization, which calculates a score of the categorical and/or textual value of a given attribute. Also, TF-IDF techniques encompass a numerical statistic in natural language processing that reflects how important a word is to a document. As such, in one or more embodiments, a TF-IDF algorithm is used to weigh a keyword and assign the importance to that keyword based at least in part on the number of times the keyword appears in a document/record or database of multiple records. The higher the TF-IDF score (weight), the rarer and more important the term, and vice versa. Each word or term has its respective TF and IDF score, and the product of the TF and IDF scores of a term is referred to as the TF-IDF weight of that term. Accordingly, one or more embodiments can include building a TF-IDF matrix which contains the TF-IDF score of each of multiple attributes.

FIG. 4 shows an example code snippet for computing a TF-IDF score in an illustrative embodiment. In this embodiment, example code snippet 400 is executed by or under the control of at least one processing system and/or device. For example, the example code snippet 400 may be viewed as comprising a portion of a software implementation of at least part of configuration issue and resolution recommendation engine 112 of the FIG. 1 embodiment.

The example code snippet 400 illustrates implementing a term frequency vectorizer, determining document frequency of attributes, and calculating a TF-IDF score across a set of content.

It is to be appreciated that this particular example code snippet shows just one example implementation of computing a TF-CDF score, and alternative implementations of the process can be used in other embodiments.

In one or more embodiments, once a TF-IDF score of all relevant attributes is calculated, the score is ready to be used for determining at least one recommendation. In such an embodiment, recommending content (e.g., configuration(s)) can be carried out using one or more similarity algorithms, one or more SVMs, matrix factorization, and/or deep learning techniques. By way merely of illustration, at least one example embodiment includes using at least one similarity-based algorithm (e.g., cosine similarity, Euclidian distance, and/or Pearson's correlation).

Pearson's correlation, also referred to as a bi-variate correlation, is a statistical algorithm used to measure the linear correlation between two variables. In one or more embodiments, the variables can include user-provided device attributes and historical data. Pearson's correlation coefficient can vary, for example, between +1 and −1, wherein a +1 represents a positive linear correlation and −1 represents a negative linear correlation, with 0 representing a lack of linear correlation. At least one embodiment includes using a formula for Pearson's correlation as shown below:

$$\text{Pearson}(x, y) = \frac{\sum xy - \frac{\sum x \sum y}{N}}{\sqrt{\left(\sum x^2 - \frac{(\sum x)^2}{N}\right)\left(\sum y^2 - \frac{(\sum y)^2}{N}\right)}}$$

wherein x and y represent data objects and N represents the number of attributes.

FIG. 5 shows an example code snippet for using a TF-IDF score matrix and Pearson's correlation in an illustrative embodiment. In this embodiment, example code snippet 500 is executed by or under the control of at least one processing system and/or device. For example, the example code snippet 500 may be viewed as comprising a portion of configuration issue and resolution recommendation engine 112 of the FIG. 1 embodiment.

The example code snippet 500 illustrates importing configuration issue and resolution data, using a TF-IDF vectorizer to encode and/or vectorize the imported content, and defining a recommended Pearson correlation based at least in part thereon. After importing the necessary libraries, historical case/incident records are read from a comma-separated values (CSV) file and loaded into a Pandas DataFrame. The content of the DataFrame is passed to a TF-IDF vectorizer for encoding, and that encoded content is used for matching and recommendation in a "recommend_pearson" function. That function is called with the case/incident that needs to be matched to historical cases. Additionally, a Pearson correlation function takes the new incident object and the DataFrame with encoded historical incident content, and returns the linearly correlated cases/incidents. Such correlated cases/incidents are appended to an array and returned from the function.

It is to be appreciated that this particular example code snippet shows just one example implementation of using a TF-IDF score matrix and Pearson's correlation, and alternative implementations of the process can be used in other embodiments.

As also detailed herein, one or more embodiments include utilizing a similar device identification engine (also referred to herein as a similar device recommendation/prediction engine). When a configuration-related issue is resolved, for example, by updating a given device with the appropriate patches, the issue is resolved in the given device and subsequently, one or more embodiments include identifying devices that have similar configuration information as the given device and auto-updating the configuration (in the identified devices) that resolved the issue in the given device.

The similar device identification engine takes details of a given device and, by using one or more machine learning techniques, identifies one or more other devices with similar device and/or configuration attributes. In at least one embodiment, such an engine uses a combination of a supervised learning algorithm (e.g., KNN) and a Euclidian distance similarity measure algorithm. KNN is a non-parametric learning algorithm which does not make any assumptions on the underlying data. This algorithm works on an assumption that data points with similar classes are closer to each other. In other words, KNN generates a selection based at least in part on the proximity to other data points, regardless of what feature the numerical values represent.

In one or more embodiments, a training dataset, with device attributes including configuration information, is stored in a database. When a device detail is passed for prediction for similar devices, the K-most similar records of devices from the training data set to the new device record are determined and/or located. From these neighboring datasets of devices, a summarized prediction is made. The device record similarity can be measured using, for example, a Manhattan distance measure, a Minkowski distance measure, a Euclidian distance measure, etc.

As detailed herein, device attributes that are categorical can be encoded and a Euclidian distance between devices can be calculated. A Euclidian distance is the straight-line distance between two vectors or data points (e.g., devices). Unlike a cosine distance, which uses the angle between two data points, a Euclidian distance measure includes computing the square root of the sum of the squared differences between the two data points (e.g., vectors). The formula for a Euclidian distance algorithm, as used by one or more embodiments, is as follows:

$$\text{Euclidean Distance} = \sqrt{\sum_{i=1}^{n} (x1_i - x2_i)^2}$$

wherein x1 represents a first row of data, x2 represents a second row of data, and i represents the index to a specific column.

With Euclidian distance measures, a smaller value indicates more similarity between the two records. A zero distance indicates that both devices are exactly similar with matching attributes and configurations.

FIG. 6 shows an example code snippet for computation of a Euclidian distance between two data vectors in an illustrative embodiment. In this embodiment, example code snippet 600 is executed by or under the control of at least one processing system and/or device. For example, the example code snippet 600 may be viewed as comprising a portion of a software implementation of at least part of similar device identification engine 114 of the FIG. 1 embodiment.

It is to be appreciated that this particular example code snippet shows just one example implementation of computation of a Euclidian distance between two data vectors, and alternative implementations of the process can be used in other embodiments.

Once the Euclidian distance is calculated between a given device and the devices in a historical data set, the calculated distance can be used to determine nearest neighbor matching. In one or more embodiments, neighbors for the device being matched (i.e., the given device) in the dataset can be determined as the K closest instances, as defined by a distance measure formula. To locate the neighbors for the device being matched within a dataset, such an embodiment includes calculating the distance between each record in the dataset to the device data being matched (using, for example, a Euclidean distance function such as detailed above). Once distances are calculated, records in the training dataset are sorted and/or ordered by their distance to the data of the device being matched. The top K datasets in the devices from the ordered list can then be returned as the most similar neighbors to the device being matched. This can be carried out, for example, by keeping track of the distance for each record in the dataset as a tuple, sorting the list of tuples by the distance (in descending order), and then retrieving the neighbors in accordance therewith.

FIG. 7 shows an example code snippet for determining a set of similar devices using nearest neighbor matching techniques in an illustrative embodiment. In this embodiment, example code snippet 700 is executed by or under the control of at least one processing system and/or device. For example, the example code snippet 700 may be viewed as comprising a portion of a software implementation of similar device identification engine 114 of the FIG. 1 embodiment.

It is to be appreciated that this particular example code snippet shows just one example implementation of determining a set of similar devices using nearest neighbor matching techniques, and alternative implementations of the process can be used in other embodiments.

In connection with example code snippet 700, K can represent the number of neighbors (num_neighbors) that can be tuned (e.g., as part of hyper parameter tuning) to improve the performance of the model to return the most similar neighbors.

FIG. 8 shows an example code snippet for implementing at least a portion of a similar device identification engine in an illustrative embodiment. In this embodiment, example code snippet 800 is executed by or under the control of at least one processing system and/or device. For example, the example code snippet 800 may be viewed as comprising a portion of a software implementation of at least part of similar device identification engine 114 of the FIG. 1 embodiment.

The example code snippet 800 illustrates steps of calculating the Euclidean distance between two vectors, locating the most similar neighbors from a dataset, and determining a list of matching and/or similar devices using KNN on at least one device attributes dataset. Additionally, the example code snippet 800 shows two functions used in one or more embodiments. Specifically, the function "Euclidian_distance" takes two device objects (and their features such as model number, OS, security patches, etc.) and returns the Euclidean distance between them. If the devices are similar, the distance will be small; if the devices show an exact match in features, the distance value will be zero.

The second function, "get_neighbors," returns a number of devices (the specific number being based on the K-value as named as num_neighbors in example code snippet 800) from the device list. The function loops through the list of all devices and calls the first function for each device along with the device to match, and generates the distance value. Ater the function loops through all devices, based on the distance values (e.g., in order of low to high), the number of devices (as matched to num_neighbors) is returned. Such a function is analogous to an implementation of KNN.

It is to be appreciated that this particular example code snippet shows just one example implementation of at least a portion of a similar device identification engine, and alternative implementations of the processes of such an engine can be used in other embodiments.

Figure 9:
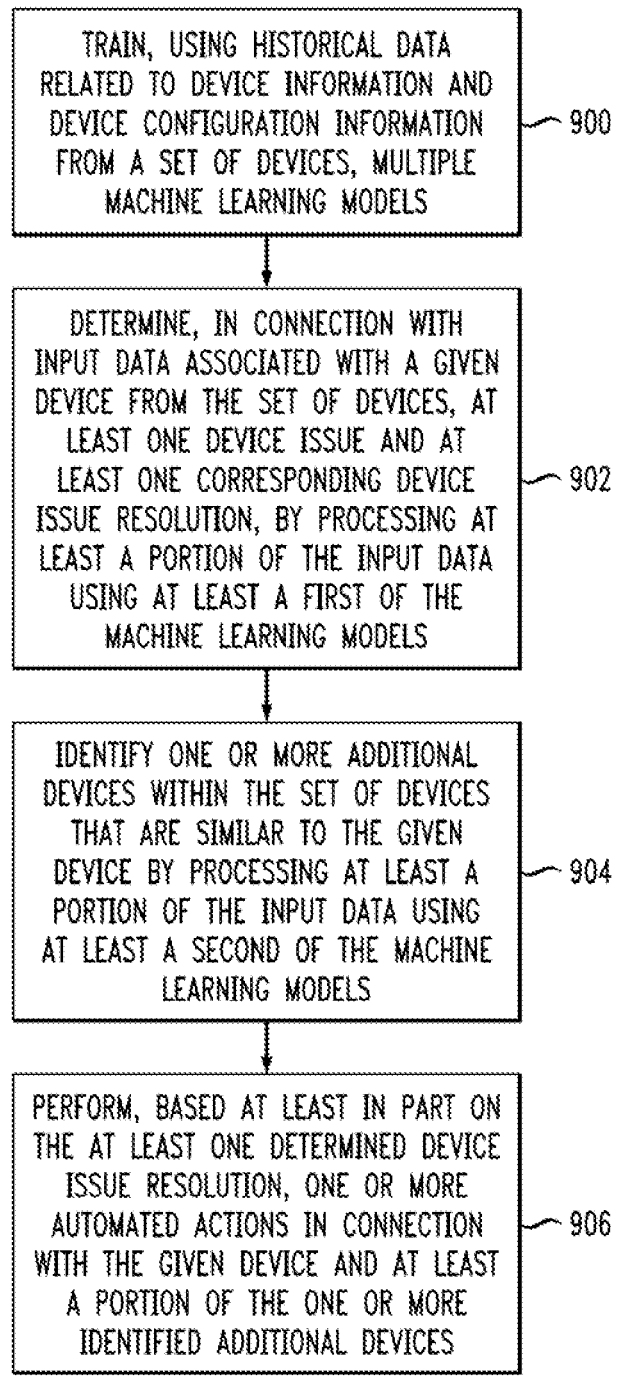
FIG. 9 is a flow diagram of a process for automatically determining configuration-based issue resolutions across multiple devices using machine learning models in an illustrative embodiment.

FIG. 9 is a flow diagram of a process for automatically determining configuration-based issue resolutions across multiple devices using machine learning models in an illustrative embodiment. It is to be understood that this particular process is only an example, and additional or alternative processes can be carried out in other embodiments.

In this embodiment, the process includes steps 900 through 906. These steps are assumed to be performed by automated device issue resolution system 105 utilizing its modules 112, 114, and 116.

Step 900 includes training, using historical data related to device information and device configuration information from a set of devices, multiple machine learning models. The multiple machine learning models can include at least a first machine learning model configured to determine one or more device issues and one or more corresponding device issue resolutions, and at least a second machine learning model configured to identify similar devices within the set of devices. Also, one or more embodiments can include applying at least one of one or more data engineering techniques and one or more feature engineering techniques to at least a portion of the historical data for dimensionality reduction and correlation purposes.

Step 902 includes determining, in connection with input data associated with a given device from the set of devices, at least one device issue and at least one corresponding device issue resolution, by processing at least a portion of the input data using the at least a first machine learning model. In at least one embodiment, processing at least a portion of the input data using the at least a first machine learning model includes using at least one term frequency-inverse document frequency algorithms and at least one Pearson correlation coefficient measure to determine the at least one issue and the at least one corresponding device issue resolution based at least in part on configuration information associated with the given device.

Step 904 includes identifying one or more additional devices within the set of devices that are similar to the given device by processing at least a portion of the input data using the at least a second machine learning model. In one or more embodiments, processing at least a portion of the input data using the at least a second machine learning model includes using at least one k-nearest neighbor algorithm and at least one Euclidean distance algorithm to identify the one or more additional devices that are similar to the given device based at least in part on configuration information associated with the one or more additional devices and the given device.

Step 906 includes performing, based at least in part on the at least one determined device issue resolution, one or more automated actions in connection with the given device and at least a portion of the one or more identified additional devices. In at least one embodiment, the at least one determined device issue resolution includes at least one set of device configurations related to resolution of the at least one determined device issue. In such an embodiment, performing the one or more automated actions includes automatically updating the given device based at least in part on the at least one set of device configurations related to resolution of the at least one determined device issue, and automatically publishing, to the at least a portion of the one or more identified additional devices, the at least one set of device configurations related to resolution of the at least one determined device issue. Additionally, in such an embodiment, the at least one set of device configurations related to resolution of the at least one determined device issues can include updated software versioning and/or at least one updated security patch.

The techniques depicted in FIG. 9 can also include retraining at least a portion of the multiple machine learning models based at least in part on the one or more automated actions.

Accordingly, the particular processing operations and other functionality described in conjunction with the flow diagram of FIG. 9 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to automatically determine configuration-based issue resolutions across multiple devices using machine learning models. These and other embodiments can effectively overcome problems associated with duplicative and error-prone manual troubleshooting efforts.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors.

Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 10 and 11. Although described in the context of system 100, these platforms may also be used to implement at least portions of other information processing systems in other embodiments.

Figure 10:
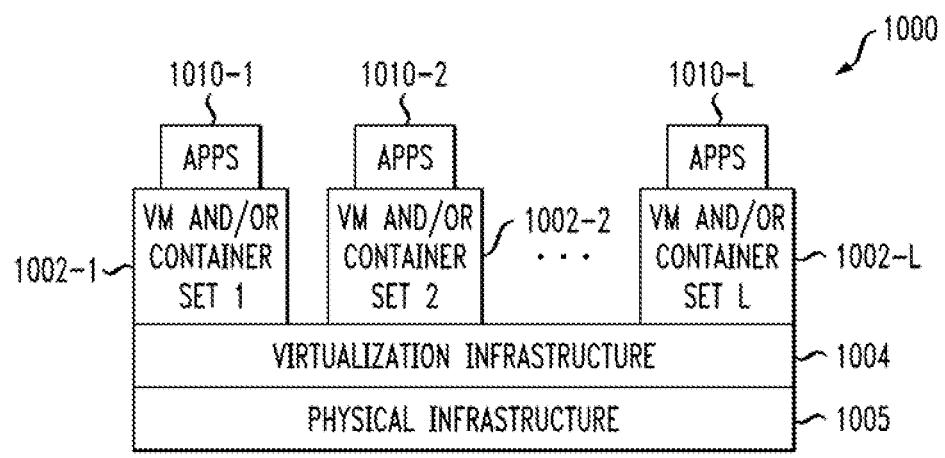
FIGS. 10 and 11 show examples of processing platforms that may be utilized to implement at least a portion of an information processing system in illustrative embodiments.
Figure 11:
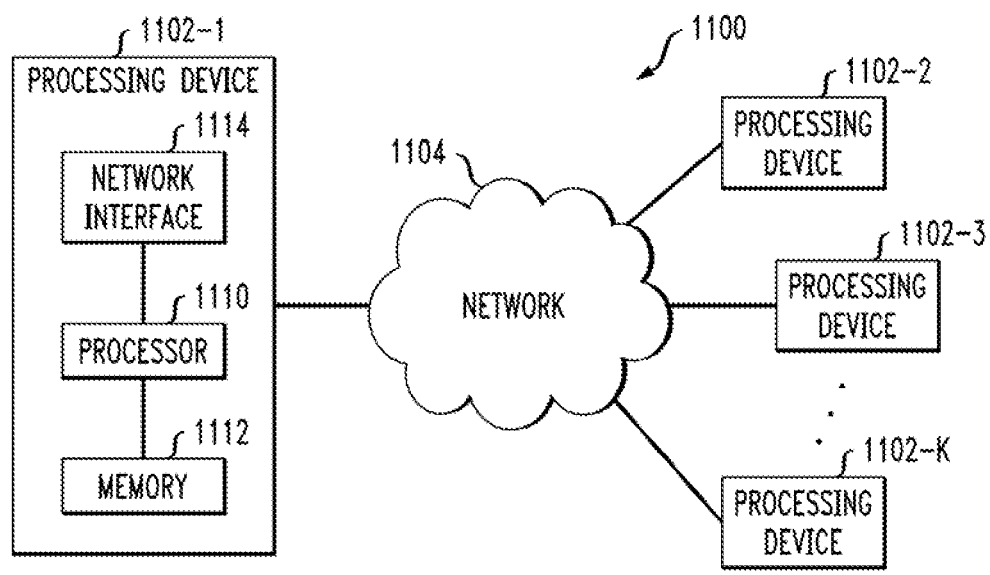

FIG. 10 shows an example processing platform comprising cloud infrastructure 1000. The cloud infrastructure 1000 comprises a combination of physical and virtual processing resources that are utilized to implement at least a portion of the information processing system 100. The cloud infrastructure 1000 comprises multiple virtual machines (VMs) and/or container sets 1002-1, 1002-2, . . . 1002-L implemented using virtualization infrastructure 1004. The virtualization infrastructure 1004 runs on physical infrastructure 1005, and illustratively comprises one or more hypervisors and/or operating system level virtualization infrastructure. The operating system level virtualization infrastructure illustratively comprises kernel control groups of a Linux operating system or other type of operating system.

The cloud infrastructure 1000 further comprises sets of applications 1010-1, 1010-2, . . . 1010-L running on respective ones of the VMs/container sets 1002-1, 1002-2, . . . 1002-L under the control of the virtualization infrastructure 1004. The VMs/container sets 1002 comprise respective VMs, respective sets of one or more containers, or respective sets of one or more containers running in VMs. In some implementations of the FIG. 10 embodiment, the VMs/container sets 1002 comprise respective VMs implemented using virtualization infrastructure 1004 that comprises at least one hypervisor.

A hypervisor platform may be used to implement a hypervisor within the virtualization infrastructure 1004, wherein the hypervisor platform has an associated virtual infrastructure management system. The underlying physical machines comprise one or more distributed processing platforms that include one or more storage systems.

In other implementations of the FIG. 10 embodiment, the VMs/container sets 1002 comprise respective containers implemented using virtualization infrastructure 1004 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element is viewed as an example of what is more generally referred to herein as a "processing device." The cloud infrastructure 1000 shown in FIG. 10 may represent at least a portion of one processing platform. Another example of such a processing platform is processing platform 1100 shown in FIG. 11.

The processing platform 1100 in this embodiment comprises a portion of system 100 and includes a plurality of processing devices, denoted 1102-1, 1102-2, 1102-3, . . . 1102-K, which communicate with one another over a network 1104.

The network 1104 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 1102-1 in the processing platform 1100 comprises a processor 1110 coupled to a memory 1112.

The processor 1110 comprises a microprocessor, a microcontroller, an application-specific integrated circuit (ASIC), a field-programmable gate array (FPGA) or other type of processing circuitry, as well as portions or combinations of such circuitry elements.

The memory 1112 comprises random access memory (RAM), read-only memory (ROM) or other types of memory, in any combination. The memory 1112 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1102-1 is network interface circuitry 1114, which is used to interface the processing device with the network 1104 and other system components, and may comprise conventional transceivers.

The other processing devices 1102 of the processing platform 1100 are assumed to be configured in a manner similar to that shown for processing device 1102-1 in the figure.

Again, the particular processing platform 1100 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of a distributed processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing devices, modules, systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:
1. A computer-implemented method comprising:
training, using historical data related to device information and device configuration information from a set of devices, multiple machine learning models comprising:

at least a first machine learning model configured to determine one or more device issues and one or more corresponding device issue resolutions; and at least a second machine learning model configured to identify similar devices within the set of devices;

determining, in connection with input data associated with a given device from the set of devices, at least one device issue and at least one corresponding device issue resolution, by processing at least a portion of the input data using the at least a first machine learning model;

identifying one or more additional devices within the set of devices that are similar to the given device by processing at least a portion of the input data using the at least a second machine learning model; and performing, based at least in part on the at least one determined device issue resolution, one or more automated actions in connection with the given device and at least a portion of the one or more identified additional devices;

wherein the method is performed by at least one processing device comprising a processor coupled to a memory.

2. The computer-implemented method of claim 1, wherein processing at least a portion of the input data using the at least a first machine learning model comprises using at least one term frequency-inverse document frequency algorithms and at least one Pearson correlation coefficient measure to determine the at least one issue and the at least one corresponding device issue resolution based at least in part on configuration information associated with the given device.

3. The computer-implemented method of claim 1, wherein processing at least a portion of the input data using the at least a second machine learning model comprises using at least one k-nearest neighbor algorithm and at least one Euclidean distance algorithm to identify the one or more additional devices that are similar to the given device based at least in part on configuration information associated with the one or more additional devices and the given device.

4. The computer-implemented method of claim 1, wherein the at least one determined device issue resolution comprises at least one set of device configurations related to resolution of the at least one determined device issue.

5. The computer-implemented method of claim 4, wherein performing the one or more automated actions comprises automatically updating the given device based at least in part on the at least one set of device configurations related to resolution of the at least one determined device issue, and automatically publishing, to the at least a portion of the one or more identified additional devices, the at least one set of device configurations related to resolution of the at least one determined device issue.

6. The computer-implemented method of claim 4, wherein the at least one set of device configurations related to resolution of the at least one determined device issues comprises one or more of updated software versioning and at least one updated security patch.

7. The computer-implemented method of claim 1, further comprising:

retraining at least a portion of the multiple machine learning models based at least in part on the one or more automated actions.

8. The computer-implemented method of claim 1, further comprising:

applying at least one of one or more data engineering techniques and one or more feature engineering techniques to at least a portion of the historical data for dimensionality reduction and correlation purposes.

9. A non-transitory processor-readable storage medium having stored therein program code of one or more software programs, wherein the program code when executed by at least one processing device causes the at least one processing device:

to train, using historical data related to device information and device configuration information from a set of devices, multiple machine learning models comprising:

at least a first machine learning model configured to determine one or more device issues and one or more corresponding device issue resolutions; and at least a second machine learning model configured to identify similar devices within the set of devices;

to determine, in connection with input data associated with a given device from the set of devices, at least one device issue and at least one corresponding device issue resolution, by processing at least a portion of the input data using the at least a first machine learning model;

to identify one or more additional devices within the set of devices that are similar to the given device by processing at least a portion of the input data using the at least a second machine learning model; and to perform, based at least in part on the at least one determined device issue resolution, one or more automated actions in connection with the given device and at least a portion of the one or more identified additional devices.

10. The non-transitory processor-readable storage medium of claim 9, wherein processing at least a portion of the input data using the at least a first machine learning model comprises using at least one term frequency-inverse document frequency algorithms and at least one Pearson correlation coefficient measure to determine the at least one issue and the at least one corresponding device issue resolution based at least in part on configuration information associated with the given device.

11. The non-transitory processor-readable storage medium of claim 9, wherein processing at least a portion of the input data using the at least a second machine learning model comprises using at least one k-nearest neighbor algorithm and at least one Euclidean distance algorithm to identify the one or more additional devices that are similar to the given device based at least in part on configuration information associated with the one or more additional devices and the given device.

12. The non-transitory processor-readable storage medium of claim 9, wherein the at least one determined device issue resolution comprises at least one set of device configurations related to resolution of the at least one determined device issue.

13. The non-transitory processor-readable storage medium of claim 12, wherein performing the one or more automated actions comprises automatically updating the given device based at least in part on the at least one set of device configurations related to resolution of the at least one determined device issue, and automatically publishing, to the at least a portion of the one or more identified additional devices, the at least one set of device configurations related to resolution of the at least one determined device issue.

14. The non-transitory processor-readable storage medium of claim 9, wherein the program code when executed by the at least one processing device causes the at least one processing device:

to retrain at least a portion of the multiple machine learning models based at least in part on the one or more automated actions.

15. An apparatus comprising:
at least one processing device comprising a processor coupled to a memory;
the at least one processing device being configured:
to train, using historical data related to device information and device configuration information from a set of devices, multiple machine learning models comprising:
at least a first machine learning model configured to determine one or more device issues and one or more corresponding device issue resolutions; and
at least a second machine learning model configured to identify similar devices within the set of devices;
to determine, in connection with input data associated with a given device from the set of devices, at least one device issue and at least one corresponding device issue resolution, by processing at least a portion of the input data using the at least a first machine learning model;
to identify one or more additional devices within the set of devices that are similar to the given device by processing at least a portion of the input data using the at least a second machine learning model; and
to perform, based at least in part on the at least one determined device issue resolution, one or more automated actions in connection with the given device and at least a portion of the one or more identified additional devices.

16. The apparatus of claim 15, wherein processing at least a portion of the input data using the at least a first machine learning model comprises using at least one term frequency-inverse document frequency algorithms and at least one Pearson correlation coefficient measure to determine the at least one issue and the at least one corresponding device issue resolution based at least in part on configuration information associated with the given device.

17. The apparatus of claim 15, wherein processing at least a portion of the input data using the at least a second machine learning model comprises using at least one k-nearest neighbor algorithm and at least one Euclidean distance algorithm to identify the one or more additional devices that are similar to the given device based at least in part on configuration information associated with the one or more additional devices and the given device.

18. The apparatus of claim 15, wherein the at least one determined device issue resolution comprises at least one set of device configurations related to resolution of the at least one determined device issue.

19. The apparatus of claim 18, wherein performing the one or more automated actions comprises automatically updating the given device based at least in part on the at least one set of device configurations related to resolution of the at least one determined device issue, and automatically publishing, to the at least a portion of the one or more identified additional devices, the at least one set of device configurations related to resolution of the at least one determined device issue.

20. The apparatus of claim 15, wherein the at least one processing device is further configured:
to retrain at least a portion of the multiple machine learning models based at least in part on the one or more automated actions.

* * * * *